United States Patent [19]

Lemarquand

[11] Patent Number: 5,130,650
[45] Date of Patent: Jul. 14, 1992

[54] BEARING WITH A MAGNETIC FIELD ANGULAR POSITION SENSOR

[75] Inventor: Guy Lemarquand, Les Vignes Pringy, France

[73] Assignee: The Torrington Company, Torrington, Conn.

[21] Appl. No.: 609,939

[22] Filed: Nov. 5, 1990

[30] Foreign Application Priority Data

Mar. 20, 1990 [FR] France ................. 90 03522

[51] Int. Cl.⁵ .............................. G01B 7/30
[52] U.S. Cl. ................ 324/207.22; 324/207.25
[58] Field of Search ............ 324/207.12-207.26, 324/173, 174, 175, 160-166; 318/653; 384/446, 448, 618; 310/168

[56] References Cited

U.S. PATENT DOCUMENTS

| | | | |
|---|---|---|---|
| 3,636,767 | 1/1972 | Duffy | 324/174 |
| 4,415,856 | 11/1983 | Welles | 324/207.25 |
| 4,490,674 | 12/1984 | Ito | 324/207.25 |
| 4,499,420 | 2/1985 | Shiraki et al. | 324/174 |
| 4,661,774 | 4/1987 | Kawakita et al. | 324/207.22 |
| 4,663,601 | 5/1987 | Troutman et al. | 324/207.25 |
| 4,732,494 | 3/1988 | Guers et al. | 324/207.22 |
| 4,791,366 | 12/1988 | Suzuki et al. | 324/207.25 |
| 4,914,387 | 4/1990 | Santos | 324/174 X |
| 4,916,390 | 4/1990 | Christoleit et al. | 324/207.22 |
| 5,004,981 | 4/1991 | Hashimoto et al. | 324/207.12 |

FOREIGN PATENT DOCUMENTS 0530250 9/1976 U.S.S.R. .................. 324/207.22

*Primary Examiner*—Kenneth A. Wieder
*Assistant Examiner*—Warren S. Edmonds
*Attorney, Agent, or Firm*—John C. Bigler

[57] ABSTRACT

A bearing with a magnetic field sensor for detecting the angular position of one element of the bearing relative to a second element of the bearing. The bearing has a ring of ferromagnetic material mounted on the rotating element. The ring has a multiple of magnetic pole segments around its circumference. The magnetic pole segments are arranged so that half of the segments are north poles and the other half of the magnetic pole segments are south poles, thus forming a two-pole ring. Two magnetic field detectors are located proximate the ring at two locations 90 degrees from one another.

6 Claims, 1 Drawing Sheet

BEARING WITH A MAGNETIC FIELD ANGULAR POSITION SENSOR

BACKGROUND OF THE INVENTION

This invention relates generally to bearings and, more particularly, to bearings in which one or more magnetic field detectors provide information concerning the angular position of one element in relation to another.

At present, several detectors, such as inductive or variable reluctance pickup detectors, are used to detect signals indicating the position, speed, or acceleration of rotary elements. These detectors generally measure changes in the intensity of magnetic field as a ferromagnetic rotor or tooth passes in front of the detector. The frequency of the detector signal is used to calculate the revolutions per minute of the revolving element. These detectors have been added to bearings in designs intended to save space, increase measurement accuracy, and simplify installation.

U.S. Pat. No. 3,716,788 describes a variable reluctance detector added to a wheel bearing assembly to measure the speed of the axle. A toothed rotor is provided on a rotating inner bearing ring opposite a toothed stator, which is attached to the outer fixed ring of the bearing. The outer ring also holds the magnetic pickup, which generates a voltage as a function of changes in magnetic flux induced by the alignment of the teeth of the stator and rotor during rotation. The frequency of the alternating current produced is proportional to the rotational speed of the axle. A comparable speed detector is described in U.S. Pat. No. 3,826,933. That speed detector has a magnetic pickup coil attached to the fixed ring of a roller bearing, while a wheel with ferromagnetic teeth is attached to the rotating ring of the bearing.

U.S. Pat. No. 4,069,435 describes a device for detecting relative motion in a bearing. That device comprises a magnetic pickup coil mounted on the seal of the fixed outer ring of a bearing. A toothed wheel is mounted on the rotary ring of the bearing. When the teeth are rotating, variations in the magnetic field are detected by the magnetic pickup. The frequency of the variations detected can be used to calculate both speed and acceleration.

According to U.S. Pat. No. 4,688,951, an electrical circuit is connected to one of the two rings of a bearing to create the magnetic field.

The known detection devices described above have many disadvantages. Variable reluctance detectors generate an output voltage signal whose frequency and amplitude are proportional to the speed.

At low speeds, the output signal is weak and may be inaccurate. Moreover, when the aforementioned detectors are added to bearings, the bearings require more space because of the added detection components. The mechanical precision and accuracy of the signal decreases due to the accumulation of tolerances, and the structure of the assembly becomes more complex. Moreover, the bearings are difficult to install, and sometimes the installation process must be separate from that of the detector.

U.S. Pat. No. 4,875,785 describes a bearing with a magnetic field detector, in which the field is produced by an annular ferromagnetic ring mounted on a rotating shaft, which is permanently magnetized to form multiple segments.

During operation, the pickup delivers a position signal in relation to a reference position by counting up or counting down (depending on the direction of rotation) the number of quantities corresponding to incremental units.

When the bearing begins to operate, the absolute position of the shaft is known only when the rotor has passed the reference position.

The foregoing illustrates limitations known to exist in present bearings with angular position pickups. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing with an angular position pickup. A rotating element and a first ring coaxial with the rotating element form an annular space therebetween, containing rolling elements. A second ring of ferromagnetic material having a pair of magnetic poles of opposite sign is mounted on the rotary element. Detecting means, for detecting a magnetic field, is mounted on a coaxial radial surface of the first ring at two locations 90 degrees from one another.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

The present invention pertains to a bearing connected to an absolute pickup. That is, at any time, the pickup gives the relative angular position of the rotor in relation to the stator without the need to return to a reference position from which counting takes place.

One object of the invention is a bearing equipped with a means for detecting the magnetic field which may consist of several detectors. The bearing is provided permanently with a magnetic field regardless of the relative speed of one element in relation to another, even if this speed is zero, which means that the bearing is simpler and less costly than other bearings which include magnetic field detectors but which require an electrical circuit to generate the magnetic field.

Another object of the invention is a bearing with a position pickup connected to a rotor and a stator, the pickup permitting continuous determination of the position of the rotor.

According to the invention, a bearing has a pair of poles of opposite signs mounted on a first revolving element, while the means of detection of the magnetic field comprises an annular element with a coaxial radial surface facing said poles on which are mounted two detectors placed 90° from one another.

The detecting elements operate in a linear manner; that is, they supply information which varies continuously and which constitutes the image of the magnetic field passing through them.

Thus, when the rotor turns 360 degrees, these detecting elements deliver a signal that comprises only a single pattern.

According to the invention, this signal is preferentially sinusoidal.

In the embodiment with two sensing elements according to the invention, these elements deliver signals of the form:

$$a(1) = A \cos \alpha$$

$$a(2) = A \sin \alpha$$

These signals are processed by known electronic systems, such as for example, a synchro-to-digital convertor (SDC) (3 elements) or a resolver-to-digital converter (RDC) (2 elements), which give the angle in numerical form, or even by microprocessor-controlled numerical electronic systems.

Figure 1:
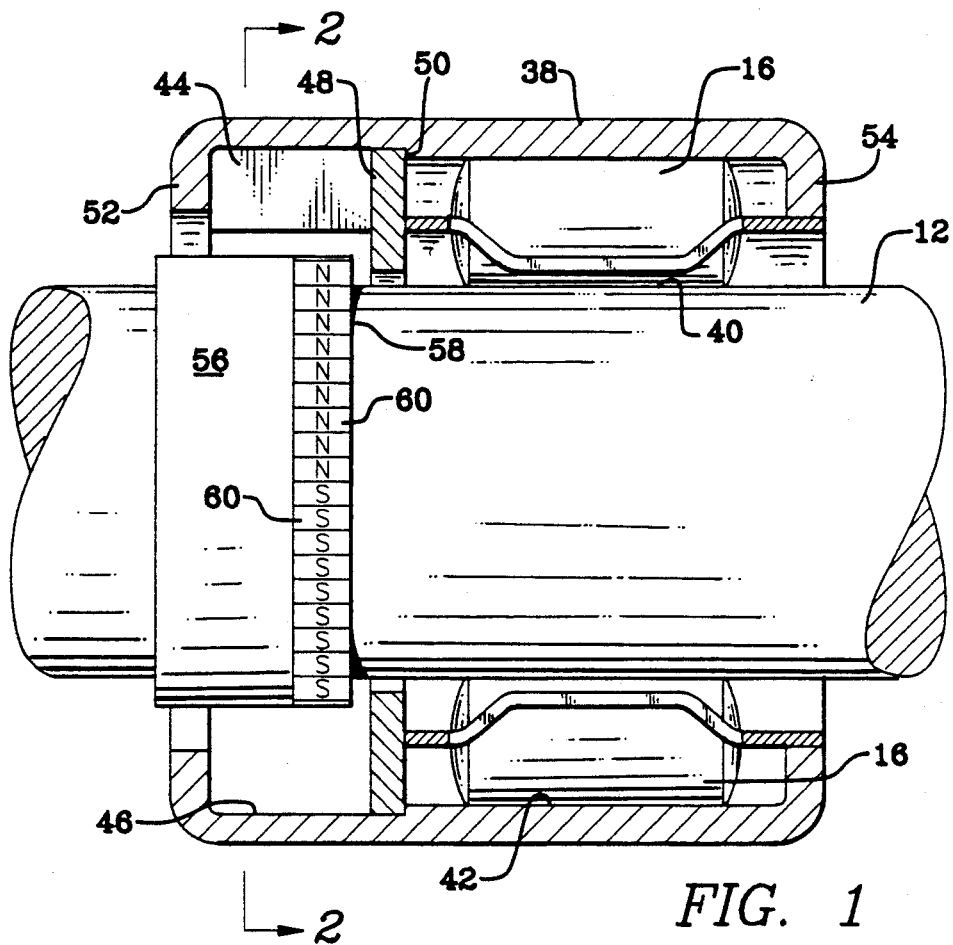
FIG. 1 is a partial axial cross-section of an embodiment of the invention.
Figure 2:
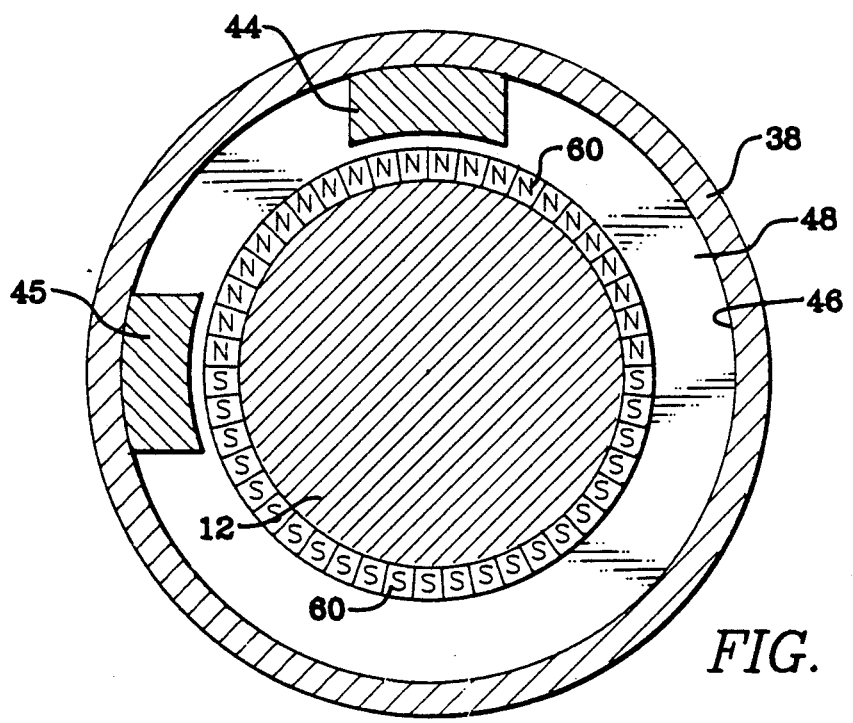
FIG. 2 is a cross-sectional view of the bearing along line 2—2 of FIG. 1.

According to FIG. 1, which shows an exemplary embodiment of the invention, a rotating shaft 12 is mounted in an annular ring 38, which is coaxial to rollers 16, designed to roll in the annular space between bearing raceway 40 on rotating shaft 12 and bearing raceway 42 on the inner surface of ring 38.

Two detectors 44, 45 are mounted on the inner surface 46 of ring 38, spaced 90 degrees from one another on the circumference. The detectors are held in their axial positions by a washer 48, resting against an annular shoulder 50, and by a circular shoulder 52 at one end of ring 38. Rollers 16 are held on the bearing raceways 40, 42 of rotating shaft 12 and ring 38, respectively, by washer 48 and circular shoulder 54 at the other end of ring 38.

A permanent magnetic field is produced by a permanently magnetized ferromagnetic ring 56, which is force-fit in the desired position on rotating shaft 12. A "ferromagnetic" material is a substance which, one it has been magnetized, remains magnetized permanently in the absence of an exterior magnetic field. An axial portion 58 of ferromagnetic ring 56 is provided on the circumference with multiple magnetic pole segments 60. Half of segments 60 comprise a north pole, while the other half comprise a south pole. These segments are arranged to form a two-pole rotor.

Having described the invention, what is claimed is:

1. A bearing with an angular position sensor, comprising:
   a rotating element;
   a first ring coaxial with the rotating element;
   rolling elements between the rotating element and the first ring;
   a second ring of ferromagnetic material mounted on the rotating element, the second ring having a sinusoidal non-repeating magnetic field for producing a signal having a single pattern over a range of 360 degrees of movement of the rotating element; and
   a pair of sensors for detecting said magnetic field, the pair of sensors being mounted on a radial surface of the first ring at locations 90 degrees from one another such that processed signals from said sensors indicate the angular position of the rotating element over a 360 degree range of movement.

2. The bearing in accordance with claim 1 wherein said second ring has only one pair of magnetic poles, said magnetic poles being of opposite polarity.

3. The bearing in accordance with claim 2 wherein each of said magnetic poles is comprised of a plurality of adjacent magnetic pole segments of like polarity.

4. A bearing with an angular position sensor, comprising:
   a rotating element;
   a first ring coaxial with the rotating element;
   rolling elements between the rotating element and the first ring;
   a second ring of ferromagnetic material mounted on the rotating element, the second ring having a non-repeating magnetic field for producing a signal having a single pattern over a range of 360 degrees of movement of the rotating element; and
   a pair of sensors for detecting said magnetic field, the pair of sensors being mounted on a radial surface of the first ring at locations 90 degrees from one another such that processed signals from said sensors indicate the angular position of the rotating element over a 360 degree range of movement.

5. The bearing in accordance with claim 4 wherein said second ring has only one pair of magnetic poles, said magnetic poles being of opposite polarity.

6. The bearing in accordance with claim 5 wherein each of said magnetic poles is comprised of a plurality of adjacent magnetic pole segments of like polarity.

* * * * *